US012808742B2

(12) United States Patent
Bertrand et al.

(10) Patent No.: US 12,808,742 B2
(45) Date of Patent: Nov. 24, 2026

(54) CHECK VALVE TESTING SYSTEMS AND LEAK DETECTION METHODS USING THE SAME

(71) Applicant: WATTS REGULATOR CO., North Andover, MA (US)

(72) Inventors: Vincent Bertrand, Hautvillers-Ouville (FR); Ousmane Konate, Hautvillers-Ouville (FR)

(73) Assignee: WATTS REGULATOR CO., North Andover, MA (US)

( * ) Notice: Subject to any disclaimer, the term of this patent is extended or adjusted under 35 U.S.C. 154(b) by 673 days.

(21) Appl. No.: 18/273,147

(22) PCT Filed: Jan. 19, 2022

(86) PCT No.: PCT/US2022/012956
§ 371 (c)(1),
(2) Date: Jul. 19, 2023

(87) PCT Pub. No.: WO2022/159477
PCT Pub. Date: Jul. 28, 2022

(65) Prior Publication Data

US 2024/0094084 A1 Mar. 21, 2024

Related U.S. Application Data

(60) Provisional application No. 63/139,481, filed on Jan. 20, 2021.

(51) Int. Cl.
*G01M 3/28* (2006.01)
*E03B 7/07* (2006.01)

(52) U.S. Cl.
CPC .......... *G01M 3/2876* (2013.01); *E03B 7/077* (2013.01)

(58) Field of Classification Search
CPC ............................ G01M 3/2876; E03B 7/077
See application file for complete search history.

(56) References Cited

U.S. PATENT DOCUMENTS 5,257,208 A 10/1993 Brown et al.
5,404,905 A 4/1995 Lauria
(Continued)

FOREIGN PATENT DOCUMENTS

WO 2019210212 A1 1/2020

OTHER PUBLICATIONS

International Search Report and Written Opinion from corresponding PCT Appln. No. PCT/US22/12956, dated Apr. 27, 2022.
(Continued)

*Primary Examiner* — Paul M. West
(74) *Attorney, Agent, or Firm* — Secant IP, PLLC

(57) ABSTRACT

Check valve testing systems and leak detection methods using the same are disclosed. In embodiments the check valve testing system includes a check valve assembly and a pressure sensor. The check valve assembly includes a first pressure zone upstream of the check valve and a second pressure zone downstream of the check valve. An inlet valve and a drain valve may be fluidly coupled to the first pressure zone, an outlet valve may be fluidly coupled to the second pressure zone. The pressure sensor is configured to detect a fluid pressure in the second pressure zone. The controller is configured to communicatively couple to the pressure sensor, and is configured to determine whether there is a leak through the check valve, a leak downstream of then outlet valve, or a leak through the outlet valve when the inlet valve, drain valve, and outlet valve are in various conditions.

36 Claims, 5 Drawing Sheets

100

(56) References Cited

U.S. PATENT DOCUMENTS

| | | | | |
|---|---|---|---|---|
| 5,425,393 | A | 6/1995 | Everett | |
| 5,713,240 | A | 2/1998 | Engelmann | |
| 6,164,116 | A * | 12/2000 | Rice .................... | G01M 3/2876 73/1.72 |
| 6,675,110 | B2 | 1/2004 | Engelmann | |
| 7,313,497 | B2 | 12/2007 | Breen et al. | |
| 9,091,360 | B2 | 7/2015 | Frahm, II | |
| 9,303,777 | B2 | 4/2016 | Frahm, II | |
| 9,476,805 | B2 | 10/2016 | Doran | |
| 9,967,022 | B2 | 5/2018 | Jurkowitz, Jr. | |
| 2006/0111875 | A1 | 5/2006 | Breen et al. | |
| 2015/0051848 | A1 | 2/2015 | Jurkowitz, Jr. | |
| 2017/0003200 | A1 | 1/2017 | Mccdowell et al. | |
| 2019/0086289 | A1 | 3/2019 | Shaw, Jr. et al. | |
| 2019/0226183 | A1 * | 7/2019 | Armano ............... | G05D 7/0641 |

OTHER PUBLICATIONS

"Type 251 EA Anti-Pollution Non-Return Valve System 01", SOCLA Technical Data Sheet, May 29, 2012, pp. 1-2.
"WB2 Membrane Solenoid Valve Indirect Action Normally Opened", SOCLA Technical Data Sheet, 2020, pp. 1-4.
Extended European Search Report from related Application No. 22743094.9 mailed Nov. 19, 2024. 10 pages.
International Preliminary Report on Patentability from corresponding PCT Appln. No. PCT/US2022/012956, dated Aug. 3, 2023.

* cited by examiner

500

CHECK VALVE TESTING SYSTEMS AND LEAK DETECTION METHODS USING THE SAME

CROSS REFERENCE TO RELATED APPLICATION

This application is a U.S. National Stage Application of PCT PCT/US22/12956 filed Jan. 19, 2022, which claims priority to U.S. Provisional Application 63/139,481, filed Jan. 20, 2021, both of which is are incorporated herein by reference in its their entirety.

TECHNICAL FIELD

The present disclosure relates to check valve testing systems, and methods using the same. In particular, the present disclosure relates to check valve testing systems and leak detection methods that are suitable for use with fluid supply systems, such as a water supply system.

BACKGROUND

Fluid supply systems often convey fluid from a pressurized source to a destination, such as a building or other structure. For example, buildings often include a water supply system that is configured to receive a pressurized supply of water from a municipal water system, and to convey water to various outlets such as toilets, faucets, fire prevention systems, etc., within the building. When the water is provided at a sufficient pressure it will be pressurized against and can flow through the outlets in a forward direction. If pressure is lost or reduced below a threshold amount, however, a "backflow" condition may arise in which the water flows backwards toward the source. As fluid backflow may contaminate the source, technologies such as backflow preventers have been implemented to limit or prevent fluid backflow.

Many fluid supply systems include one or more check valves that function to limit or prevent backflow. Over time the components of a check valve may deteriorate, causing the check valve to leak or otherwise fail. To confirm that a check valve is functional and does not require replacement, maintenance personnel may periodically test its operation. Such testing is typically performed manually, which can be time consuming and inconvenient—particularly if the valve is located in a hard to reach location.

A need therefore remains in the art for check valves that are more easily and more conveniently tested, as well as systems and methods that utilize such valves. The present disclosure is aimed at such needs.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
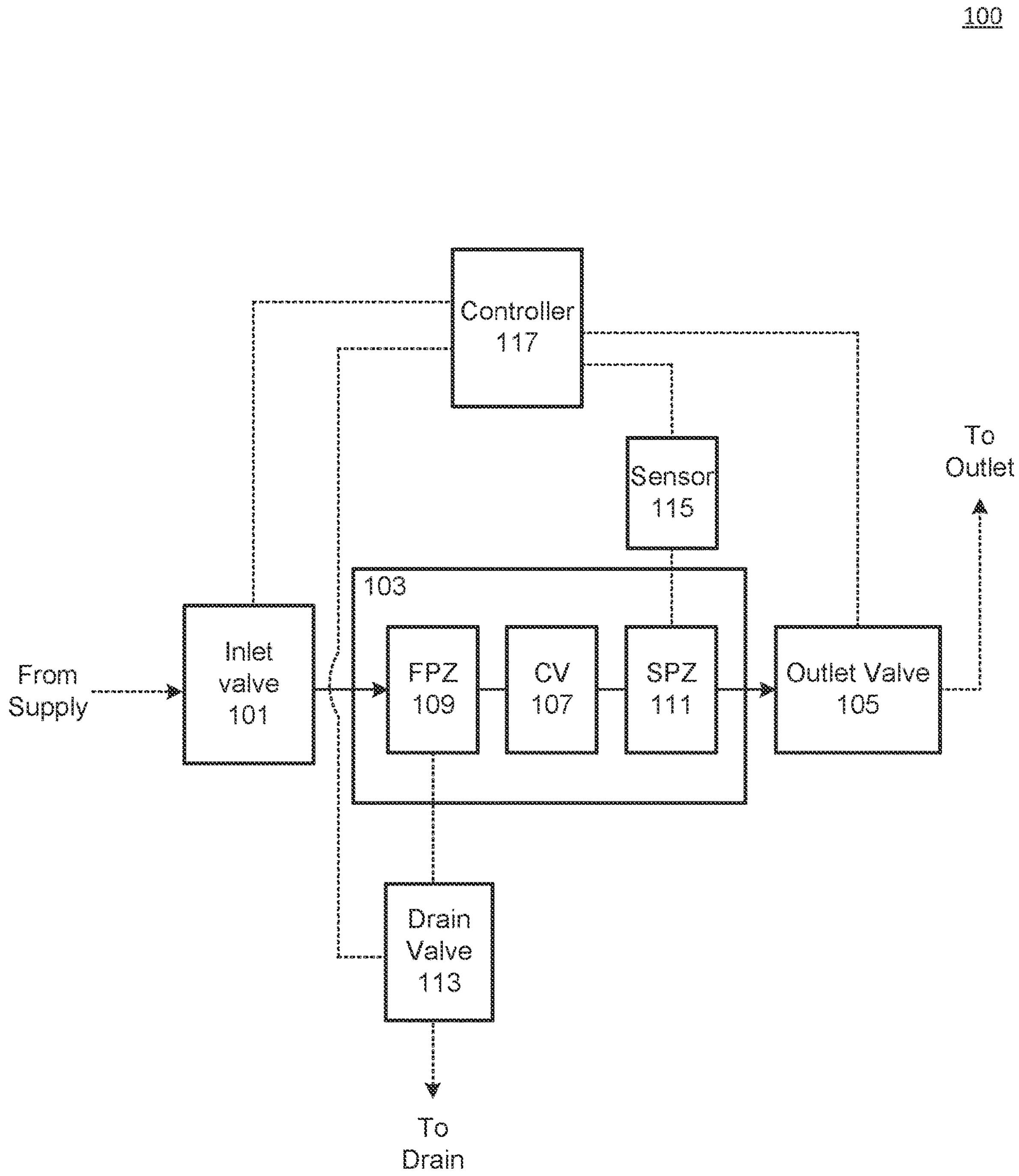
FIG. 1 is a block diagram of a liquid supply system including a check valve testing system consistent with the present disclosure.

Although the following Detailed Description will proceed with reference being made to illustrative embodiments, many alternatives, modifications and variations thereof will be apparent to those skilled in the art.

DETAILED DESCRIPTION

As noted in the background water and other fluid supply systems often include a check valve assembly that is configured to limit or prevent fluid backflow towards a source. Components in such valves can break down over time, causing the valve to leak or otherwise malfunction. In a water system, a substantial amount of water may result from a leaking or otherwise malfunctioning valve. Moreover, substantial property damage may occur if a check valve leaks or otherwise malfunctions during an emergency event, such as a backflow event.

Testable check valves have been developed to address such issues. With such a valve, a maintenance technician can manually test the operation of the valve and determine whether it is working properly or needs replacement. Unfortunately such testing is often difficult and inconvenient due to the location of the valve. As a result, many check valves go untested for long periods, during which the valve may leak or otherwise fail.

The present disclosure relates to check valve testing systems, and leak detection methods using the same. As will be described in detail below, the systems described herein include a testable check valve assembly that includes a check valve, a first pressure zone (FPZ) upstream of the check valve, and a second pressure zone (SPZ) downstream of the check valve. The FPZ is fluidly coupled to (and in some cases forms part of) an inlet of the check valve assembly, which in turn is configured to fluidly couple to an outlet of an electronically actuated inlet valve. The inlet valve further includes an inlet that is configured to fluidly couple to a liquid source, such as but not limited to a municipal water supply. The SPZ is fluidly coupled to (and in some cases forms part of) an outlet of the check valve assembly. The outlet of the check valve assembly is further configured to fluidly couple to an inlet of an electronically actuated outlet valve. An outlet of the outlet valve is configured to fluidly couple to one or more outlets in a destination, such as faucets, toilets, etc. within a building or other location. The system further includes an electronically actuated drain valve, a pressure sensor, and a controller. The electronically actuated drain valve is configured to fluidly couple to the FPZ (i.e., upstream of the check valve). The pressure sensor is configured to detect a fluid pressure within the SPZ (i.e., downstream of the check valve), and to provide a sensor signal indicative of the detected liquid pressure within the SPZ to the controller. The controller is configured to communicatively couple with the inlet valve, the outlet valve, the drain valve, and the pressure sensor, e.g., via a wired or wireless communications protocol.

As used herein, the term "electronically actuated" when used in connection with a valve means that the valve is configured to close or open in response to an electronic signal, such as a control signal. For example, an electronically actuated valve may include or be coupled to a pilot that is configured to close the valve in response to a control signal. Any suitable pilot may be used, and in some embodiments the electronically actuated valves described herein may include or be coupled to a pneumatic pilot, a hydraulic pilot, an electrical pilot (e.g., a solenoid such as a proportional solenoid), or a combination thereof.

In normal operation the inlet and outlet valves are open, the drain valve is closed, and liquid (e.g., water) flows in a forward direction through the inlet valve, through the FPZ, through the check valve, through the SPZ, through the outlet valve, and to one or more outlets in a destination. During a testing operation, however, the controller configured to conduct one or more test operations to determine whether there are any leaks in the system, and/or to determine whether the check valve within the check valve assembly is functioning properly.

In embodiments, during a testing operation the controller issues (or causes the issuance of) a first control signal, wherein the first control signal is configured to cause the inlet valve to close. For example, the control signal may be transmitted to a pilot that is included in or coupled to the inlet valve, in response to which the pilot causes the inlet valve to close. The controller may then monitor the liquid pressure in the SPZ, e.g., based at least in part on the sensor signal provided by the pressure sensor. If the controller determines that the liquid pressure in the SPZ varies (e.g., falls) in response to closing of the inlet valve, the controller may determine that there is a leak downstream of the check valve and issue (or cause the issuance of) an appropriate leak notification. For example, controller may transmit or cause the transmission of a leak notification signal to an external electronic device (e.g., a cellular phone, smart phone, laptop, desktop, etc.), wherein the leak notification message is configured to cause the electronic device to present a leak notification indicator, e.g., on a display or other user audiovisual element of the electronic device.

If the pressure in the SPZ remains steady following closure of the inlet valve, the controller may optionally issue a (second) control signal to the outlet valve, wherein the (second) control signal is configured to cause the outlet valve to close. Regardless of whether the controller causes the outlet valve to close, the controller may issue a (third) control signal to the drain valve, wherein the third control signal is configured to cause the drain valve to open. The controller may then monitor the liquid pressure within the SPZ, based at least on the sensor signal provided by the pressure sensor. If the controller determines that the liquid pressure within the SPZ varies (e.g., falls) following opening of the drain valve, the controller may determine that there is a leak through the check valve within the check valve assembly. In such instances the controller may issue or cause the issuance of a faulty check valve notification. For example, the controller may transmit or cause the transmission of a faulty check valve notification to an external electronic device, wherein the faulty check valve notification is configured to cause the electronic device to present a faulty check valve notification indicator, e.g., on a display or other audiovisual element of the electronic device.

As will be appreciated, the systems and methods described herein can enable convenient and frequent testing of a check valve assembly, without the need the need for manual interaction with components of a liquid supply system e.g., by a maintenance technician.

FIG. 1 illustrates one example of a check valve test system consistent with the present disclosure. System 100 includes an inlet valve 101, a check valve assembly 103, an outlet valve 105, a drain valve 113, a sensor 115, and a controller 117. Inlet valve 101 and outlet valve 105 are each an electronically actuated valve that has an open condition in which fluid flow through the valve is permitted, and a closed condition in which fluid flow through the valve is prevented. Any suitable type of electronically actuated valve may be used as inlet valve 101 or outlet valve 105, and such valves may be the same or different. Non-limiting examples of types of valves that can be used as inlet valve 101 and outlet valve 105 include ball, gate, or other types of valves that can be transitioned between an open and closed condition in response to a control signal, e.g., issued by controller 117. In embodiments inlet valve 101 and/or outlet valve 105 each includes or is coupled to a pilot (e.g., a pneumatic or electrical pilot) that is configured to open or close inlet valve 101 or outlet valve 105 in response to a corresponding control signal. For example, inlet valve 101 and/or outlet valve 105 may include or be coupled to a respective solenoid (e.g., a proportional solenoid), wherein the solenoid is configured to open or close inlet valve 101 or outlet valve 105 in response to a control signal. Alternatively, inlet valve 101 and/or outlet valve 105 may include or be coupled to a pneumatic pilot that is configured to open or close inlet valve 101 and/or outlet valve 105 in response to a corresponding control signal. Non-limiting examples of valves that may be used as inlet valve 101 and/or outlet valve 105 include solenoid or membrane ball valves, such as the WZBZ membrane solenoid valve and the 273/W solenoid ball valve sold by WATTS®.

Check valve assembly 103 may be any suitable type of check valve assembly, such as but not limited to a check valve assembly that includes one or multiple check valves. For the sake of illustration, check valve assembly 103 is shown as including a single check valve 107, a first pressure zone (FPZ) 109 upstream of check valve 107, and a second pressure zone (SPZ) 111 downstream of check valve 107. Such a configuration is not required, however, and check valve assembly 103 may have any suitable number of check valves with a corresponding number of pressure zones upstream and downstream of each check valve. For example, check valve assembly 103 may include 1, 2, 3, 4, 5, or more check valves, with pressure zones upstream and downstream of each of check valve. Non-limiting examples of check valve assemblies that may be used as check valve assembly 103 include the EA251 and EA453 non-return valves sold by WATTS®. In any case, check valve assembly 103 is generally configured to permit fluid flow in a forward direction (i.e., from an inlet of check valve assembly 103 towards an outlet thereof), but to prevent fluid flow in a backward direction (i.e., from an outlet of check valve assembly 103 towards an inlet thereof).

As used herein, the term "pressure zone" when used in connection with a check valve assembly means a conduit in which fluid can flow or be maintained under pressure. In general, the check valve assemblies described herein include at least two pressure zones per check valve included in the assembly—one upstream of the check valve and one downstream of the check valve. In embodiments where a check valve assembly that includes more than one check valve, an pressure zone that is downstream of one check valve in the assembly may be upstream of a another check valve in the assembly, and vice versa. For example, a check valve assembly that includes two check valves may include first, second, and third pressure zones, wherein the first pressure zone is upstream of the first check valve, the third pressure zone is downstream of the second check valve, and the second pressure zone is downstream of the first check valve but upstream of the second check valve.

In the embodiment of FIG. 1, inlet valve 101 includes a (first) inlet and a (first) outlet. The inlet of inlet valve 101 is fluidly coupled to a liquid supply, and the outlet of inlet valve 101 is fluidly coupled to an inlet of check valve assembly 103. The nature of the liquid supply is not limited and any suitable liquid supply may be used. In embodiments the liquid supply is a water supply, such as but not limited to a municipal water supply. More specifically, the outlet of inlet valve 101 is fluidly coupled to FPZ 109 in check valve assembly 103.

Check valve assembly 103 includes an inlet and at least two outlets. As noted above the inlet of check valve assembly 103 is configured to fluidly couple to inlet valve 101. In embodiments, the inlet of check valve assembly 103 is an opening that is fluidly coupled to FPZ 109. The first outlet of check valve assembly is fluidly coupled to outlet valve 105. In embodiments, the first outlet of check valve assembly 103 is an opening that is fluidly coupled to SPZ 111. The second outlet from check valve assembly 103 is fluidly coupled to drain valve 113.

Check valve 107 is disposed between FPZ 109 and SPZ 111 and is configured to regulate the flow of liquid through check valve assembly 103. The nature and configuration of check valve 107 is not limited, and any suitable check valve may be used. Non-limiting examples of suitable check valves that may be used as check valve 107 include globe valves, ball check valves, double door check valves, lift check valves (e.g. a piston check valve), stop check valves, swing check valves, tilting disc check valves, combinations thereof, and the like. Without limitation, in embodiments check valve 107 is or includes a piston check valve. Regardless of its nature, check valve 107 is generally configured to permit fluid to flow from the inlet that is configured to fluidly couple to inlet valve 101 to the outlet that is configured to couple to outlet valve 105.

In the embodiment of FIG. 1, the second outlet from check valve assembly is or includes an opening in FPZ 109 that is fluidly coupled to drain valve 113. As such, drain valve 113 may be understood as being fluidly coupled to check valve assembly 103 upstream of check valve 107. Like inlet and outlet valves 101, 105, drain valve 113 is an electronically actuated valve that has an open condition in which fluid flow through the valve is permitted, and a closed condition in which fluid flow through the valve is prevented. During normal operation, drain valve 113 is in the closed condition. During a test operation, drain valve 113 may be in the open condition.

Any suitable type of electronically actuated valve may be used as drain valve 113. Non-limiting examples of types of valves that can be used as drain valve 113 include those mentioned above as suitable for use as inlet valve 101 and/or outlet valve 105. Without limitation, in embodiments drain valve 113 includes or is coupled to a pilot (e.g., a pneumatic or electrical pilot) that is configured to open or close drain valve 113 responsive to a corresponding control signal. For example, drain valve 113 may include or be coupled to a solenoid (e.g., a proportional solenoid), wherein the solenoid is configured to open or close drain valve 113 a control signal from controller 117. Alternatively, drain valve 113 may include or be coupled to a pneumatic pilot that is configured to open or close drain valve 113 responsive to a control signal. Non-limiting examples of valves that may be used as drain valve 113 include the DSVP series of pilot-operated water inlet valves sold by DELTROL CONTROLS®.

Sensor 115 is or includes a pressure sensor that is configured to detect fluid pressure downstream of check valve 107. For example, sensor 115 may be or include a pressure sensor that is configured to detect fluid pressure within SPZ 111, at or within the outlet of check valve assembly 103 that is configured to couple to outlet valve 105, and/or at any other point in the fluid pathway between check valve 107 and outlet valve 105. Without limitation, in embodiments sensor 115 is or includes a pressure sensor that is configured to detect fluid pressure within SPZ 111. Non-limiting examples of suitable pressure sensors that may be used as sensor 115 include the 500 and 600 series pressure sensors sold by HUBA CONTROL® and the DN5 servo-controlled manual operated valve sold by A.U.K. MULLER®.

Check valve assembly 103 may include a test cock or port that allows sensor 115 to couple to check valve assembly 103 such that it can detect fluid pressure within second pressure zone 111. In any case, sensor 115 is configured to detect a fluid pressure downstream of check valve 107 and produce a sensor signal indicative of the detected pressure. As will be described below, the sensor signal can be used by controller 117 to determine the detected pressure, e.g., during a test of check valve 107.

Controller 117 is configured to communicatively couple to sensor 115, and to communicatively couple with inlet valve 101, outlet valve 105, and drain valve 113 or one or more actuators that are configured to actuate such valves. In general, controller 117 is configured to control the operation of inlet valve 101, outlet valve 105, and drain valve 113, and to execute one or more testing operations consistent with the present disclosure. For example, during normal operation of system 100, inlet valve 101 and outlet valve 105 may be open and drain valve 113 may be closed. During such operation controller 117 may do nothing, or it may issue control signals that cause inlet valve 101 and outlet valve 105 to remain open and drain valve 113 to remain closed. During a testing operation, however, controller 117 may issue control signals that cause one or more of inlet valve 101 and outlet valve 105 to close, and which cause drain valve 113 to open. During the testing operation, the controller may determine the liquid pressure between check valve 107 and outlet valve 105 (e.g., within SPZ 111) based at least in part on the sensor signal produced by sensor 115. From the determined pressure and the configuration of valves 101, 105, and 113, controller 117 may determine whether there is a leak downstream of check valve assembly, and/or whether check valve 107 is functioning normally, as will be described in detail later.

Figure 2:
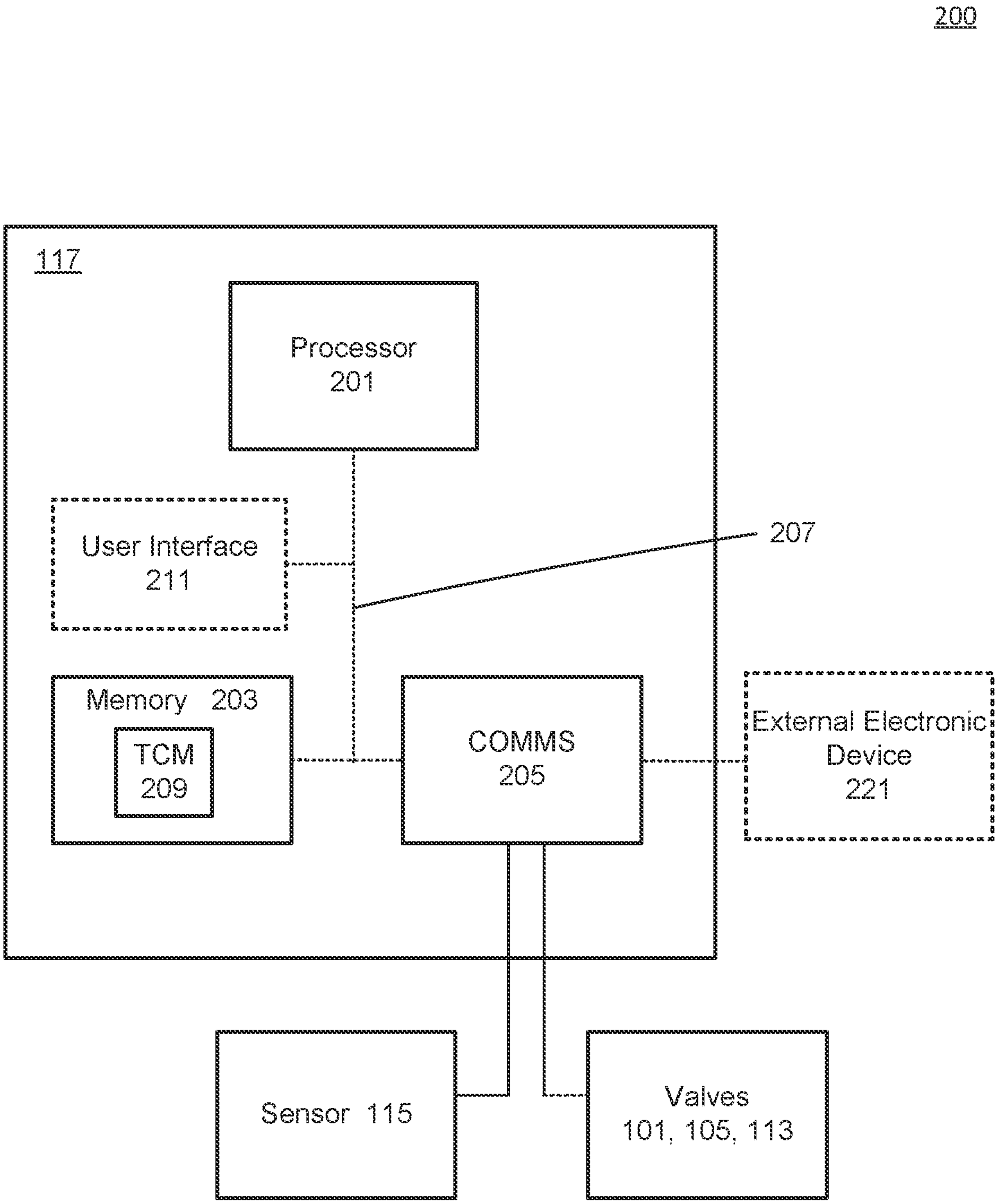
FIG. 2 is a block diagram of one example of a controller consistent with the present disclosure.

FIG. 2 is a block diagram of one example of a controller that may be used as controller 117 in accordance with the present disclosure. Controller 117 includes a processor 201, memory 203, and communications circuitry (COMMS) 205, which are communicatively coupled to one another via a bus 207. Controller 117 may optionally further include a user interface 211. When used, user interface 211 may provide a mechanism for a user to interact with controller 117, e.g., to set various parameters of testing operations consistent with the present disclosure. The nature and configuration of user interface 211 is not limited, and any suitable user interface may be used. Alternatively or additionally, controller 117 may be configured to communicatively couple to an external electronic device 221 (e.g., a cellular phone, smart phone, laptop, desktop, etc.), and user interface 211 may be provided by the external electronic device 221. In embodiments, controller 117 is included in or coupled to an electronic water meter that is configured to meter water flowing through system 100. For example, controller 117 may be included in or couple to water meter that is fluidly coupled between inlet valve 101 and check valve 103, or between check valve 103 and outlet valve 105. Examples of systems that include a controller that is included in a water meter are described later in connection with FIGS. 4 and 5.

Processor 201 may be any suitable general-purpose processor or application specific integrated circuit. Without limitation, in embodiments processor 201 is one or more single or multicore processors produced by INTEL® corporation, APPLE® corporation, AMD® corporation, SAMSUNG® corporation, NVIDIA® corporation, Advanced Risc Machines (ARM®) corporation, combinations thereof, or the like. While FIG. 2 depicts the use of a single processor 201, it should be understood that multiple processors can be used.

Memory 203 may be any suitable type of computer readable memory. Examples of memory types that may be used as memory 203 include but are not limited to: programmable memory, non-volatile memory, read only memory, electrically programmable memory, random access memory, flash memory (which may include, for example NAND or NOR type memory structures), magnetic disk memory, optical disk memory, phase change memory, memristor memory technology, spin torque transfer memory, combinations thereof, and the like. Additionally or alternatively, memory 203 may include other and/or later-developed types of computer-readable memory.

COMMS 205 may include hardware (i.e., circuitry), software, or a combination of hardware and software that is configured to allow controller 117 to transmit and receive messages via wired and/or wireless communication from one or more external devices, such as but not limited to an external electronic device 221 as noted above, valves 101, 105, 113, and sensor 115. While FIG. 2 illustrates COMMS 205 as being communicatively coupled directly to valves 101, 105, 113, it may instead be coupled to actuators/pilots that can control whether valves 101, 105, 113 are in an open or a closed position, respectively. Communication between COMMS 205, valves 101, 105, 113, sensor 115, and optional external electronic device 221 may occur, for example, over a wired or wireless connection using one or more currently known or future developed communication standards. COMMS 205 may include hardware to support such communication, e.g., one or more transponders, antennas, BLUETOOTH™ chips, personal area network chips, near field communication chips, wired and/or wireless network interface circuitry, combinations thereof, and the like. As shown, COMMS 205 may be communicatively coupled to sensor 115 and valves 101, 105, 113, via a wired or wireless communications link. In embodiments COMMS 205 is communicatively coupled sensor 115, valves 101, 105, 113, and optionally external electronic device when system 100 is in an assembled state. In such a configuration, COMMS 205 is configured to receive sensor signals from sensor 115, and to transmit control signals to valves 101, 105, 113 or an actuator thereof.

Controller 117 further includes testing control module (TCM) 209. In this specific context, the term "module" refers to software, firmware, circuitry, and/or combinations thereof that is/are configured to perform one or more check valve testing operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in controller 117, e.g., within memory 203 or other storage. For example, TCM 209 may be in the form of computer readable instructions (e.g., stored on memory 203) which when executed by processor 201 cause controller 117 to perform check valve testing operations consistent with the present disclosure, or to return system 100 to a normal operating condition (e.g., before or after the performance of a check valve testing operation). Alternatively, in embodiments, TCM 209 is in the form of logic that is implemented at least in part in hardware to perform check valve testing operations consistent with the present disclosure, or to return system 100 to a normal operating condition (e.g., before or after the performance of a check valve testing operation).

In embodiments TCM 209 is configured to cause controller 117 to perform check valve testing operations to determine whether there is a leak downstream of check valve assembly 103. To perform such operations TCM 209 may cause controller 117 (or, more specifically, COMMS 205) to issue a first control signal to inlet valve 101, wherein the first control signal is configured to cause inlet valve 101 to move to a closed position. In embodiments where inlet valve 101 is coupled to an external pilot or other actuator, the first control signal may cause the external pilot/actuator to close inlet valve 101. During this time drain valve 113 is in a closed condition. In any case, TCM 209 may then cause controller 117 to monitor the liquid pressure downstream of check valve 107, e.g., within SPZ 111. For example, TCM 209 may cause controller 117 to monitor the liquid pressure within SPZ 111 or at another point downstream of check valve assembly 103 for a specified period of time, hereinafter referred to as a first test period. The first test period may extend for any suitable length of time, and in some embodiments ranges from greater than 0 to about 60 seconds, such as from greater than 0 to about 30 seconds, greater than 0 to about 15 seconds, or even greater than 0 to about 5 seconds. In any case, controller 117 may determine the liquid pressure detected by sensor 115 within SPZ 111 or at another point downstream of check valve assembly 103 based at least in part on sensor signals produced by sensor 115 over the first test period.

Controller 117 may then determine whether the detected pressure remains stable over the first test period. As used herein, the term "stable" when used in connection with a detected pressure means that the detected pressure did not vary by greater than a defined pressure variance threshold. The pressure variance threshold may be selected to achieve a balance between a desired sensitivity of the system and the desire to limit or false positive results. In embodiments, the pressure variance threshold is set to about a 0.5%, 1%, 3%, or even 5% change in detected pressure over the test period. In embodiments, the pressure variance threshold is set to a 0.5%, 1%, 3%, or 5% drop in pressure over the test period. The controllers may determine that a pressure is unstable if it varies by more than a pressure variance threshold during a relevant test period.

If the detected pressure remains stable over the first test period, TCM 209 may cause controller 117 to determine that a leak is not present downstream of check valve assembly 103 or, more specifically, downstream of outlet valve 105. If the detected pressure varies by more than the threshold pressure variance over the first test period, however, TCM 209 may cause controller 117 to determine that a leak or other source of pressure drop is present downstream of check valve assembly 103. In such instances, TCM 209 may cause controller 117 to issue or cause the issuance of an appropriate leak notification. For example, controller 117 may display a leak notification indicator on optional user interface 211. Alternatively or additionally, controller 117 may transmit or cause the transmission of a leak notification signal to external electronic device 221, wherein the leak notification message is configured to cause external electronic device 221 to present a leak notification indicator, e.g., on a display or other user audiovisual element of the electronic device.

If the detected pressure remains steady during the first test period (i.e., following closure of inlet valve 101), TCM 209 may cause controller 117 to determine that there is not a leak downstream of check valve assembly 103 or, more specifically, outlet valve 105. In such instances, TCM 209 may cause controller 117 to perform additional testing operations, hereinafter referred to as "second testing operations". For example, TCM 209 may optionally cause controller 117 to issue a second control signal, wherein the second control signal is configured to cause outlet valve 105 to move to a closed condition. For example, controller 117 may transmit a second control signal to an actuator or pilot of outlet valve 105, wherein the second control signal causes the actuator or pilot of outlet valve 105 to move outlet valve 105 to a closed condition. During this time, drain valve 113 is in the closed condition. In such instances TCM 209 may then cause controller 117 to monitor the pressure downstream of check valve 107 (i.e., within SPZ 111 or at another location between check valve 107 and outlet valve 105) for a second test period. The length of the second test period may be the same or different as the length of the first test period, and may extend from the time at which outlet valve 105 is moved to the closed condition. In any case, TCM 209 may cause controller 117 to monitor the pressure detected by sensor 115 during the second test period based at least in part on the sensor signals produced by sensor 115.

For example, TCM 209 may cause controller 117 to determine the pressure detected by sensor 115 based at least in part on sensor signals produced by sensor 115, and to determine whether the detected pressure remains stable over the second test period. The manner in which the controller 117 determines that the pressure remains stable during the second test period is the same as described above for the first test period and so is not reiterated in the interest of brevity. If controller 117 determines that the detected pressure did not remain stable (i.e., dropped or dropped more than a threshold pressure variance), TCM 209 may cause controller 117 to determine that there is a leak in outlet valve 105. In such instances, TCM 209 may cause controller 117 to issue or cause the issuance of an appropriate leak notification, e.g., in the same manner described previously.

If controller 117 determines that the detected pressure remains stable over the second test period (or if the second testing operations are not performed), TCM 209 may cause controller 117 to perform additional testing operations, hereinafter referred to as third testing operations. The third testing operations may be performed following the closure of inlet valve 101 and optionally following the closure of outlet valve 105. During the third testing operations, TCM 209 may cause controller 117 to issue a third control signal, wherein the third control signal is configured to cause drain valve 113 to move to an open condition, while inlet valve 101 is closed and outlet valve 105 is optionally closed. TCM 209 may then cause controller 117 to monitor the pressure downstream of check valve 107 (e.g., within SPZ 111 or at any point between check valve 107 and outlet valve 105) over a third test period. The length of the third test period may be the same or different than the first and/or second test periods, and may extend from the time at which drain valve 113 is opened while inlet valve 101 (and optionally outlet valve 105) is closed.

In any case, TCM 209 may cause controller 117 to monitor the pressure detected by sensor 115 during the third test period based at least in part on the sensor signals produced by sensor 115. For example, TCM 209 may cause controller 117 to determine the pressure detected by sensor 115 based at least in part on sensor signals produced by sensor 115 during the third test period, and to determine whether the detected pressure remains stable over the second test period. The manner in which the controller 117 determines that the pressure remains stable during the third test period is the same as described above for the first and second test periods and so is not reiterated in the interest of brevity. If controller 117 determines that the detected pressure did not remain stable over the third test period (e.g., the pressure dropped or dropped more than a threshold pressure variance), TCM 209 may cause controller 117 to determine that there is a leak in check valve 107. In such instances, TCM 209 may cause controller 117 to issue or cause the issuance of an appropriate leak notification, e.g., in the same manner described previously concerning leaks detected in outlet valve 105 or downstream of outlet valve 105. In that way, TCM 209 may enable controller 117 to test the functionality of check valve 107 and determine whether it is or is not functioning properly.

As noted above the systems of the present disclosure are not limited to use with check valve assemblies that include a single check valve. Indeed, the systems described herein can be used with check valve assemblies that include a plurality (e.g., 2 or more) check valves. In such instances, the systems can include one or multiple (e.g., 2 or more) pressure sensors, wherein each pressure sensor is configured to monitor the pressure in a pressure zone that is downstream of one or more of the check valve assemblies. For example, in instances where check valve assembly 103 includes two or more check valves, a single pressure sensor may be used and configured to detect the pressure downstream of all of the check valves in the assembly. In such instances, testing operations identical to those conducted above could be conducted to detect whether there is a leak through any of the check valves in the assembly. In the event a leak is detected through the check valve assembly, however, such a system may not be able to identify which of the plurality of check valves in the assembly is leaking. If such functionality is desired, a plurality of pressure sensors may be used, wherein each pressure sensor is configured to detect the pressure in a pressure zone immediately downstream of a respective check valve. In such instances controller 117 may: cause inlet valve 101 to close; optionally cause outlet valve 105 to close; cause drain valve 113 to open; and monitor the pressure detected by each pressure sensor over a defined test period. If the each detected pressure remains stable over the test period, controller 117 may determine that all check valves in the assembly are functioning properly. But if the pressure detected by one or more of the plurality of sensors varies over the test period, controller 117 may determine that a leak is present through the check valve corresponding to the pressure sensor that is reporting the variable pressure.

While the foregoing description focuses on embodiments in which controller 117 and sensor 115 are coupled to other elements of a fluid supply system (e.g., inlet valve 101, check valve assembly 103, outlet valve 105, drain valve 113, etc.), such a configuration is not required and controller 117 and sensor 115 may be provisioned separately. For example, controller 117 and sensor 115 may be supplied separately from a fluid supply system and may be configured such that they can couple to the above noted components of a fluid supply system in order to perform check valve testing operations as discussed above.

Figure 3:
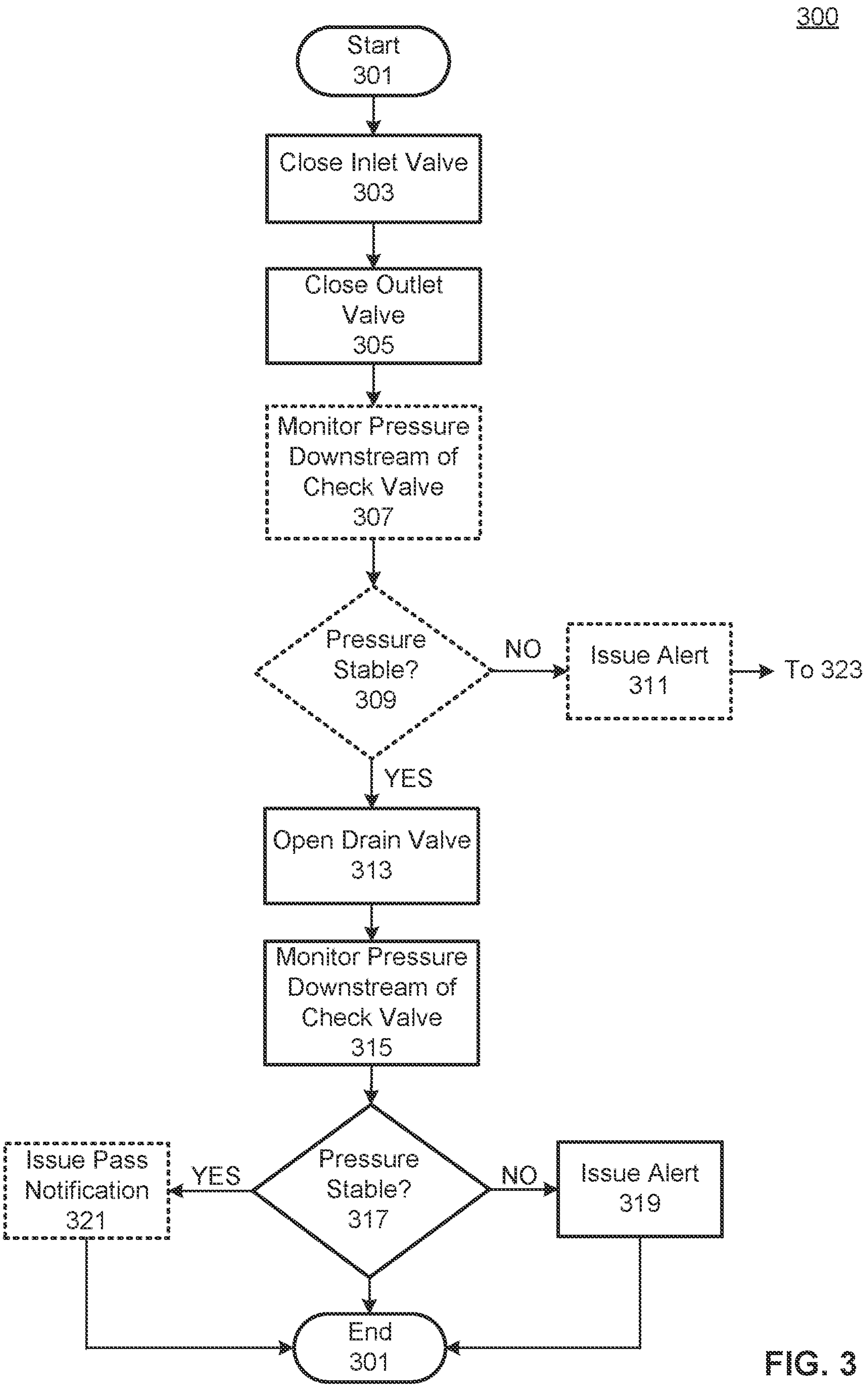
FIG. 3 is a flow diagram of one example of a method of testing a check valve consistent with the present disclosure.

Another aspect of the present disclosure relates to methods of testing check valves using a system consistent with the systems described herein. In that regard attention is directed to FIG. 3, which is a flow diagram of example operations of a method of testing a check valve consistent with the present disclosure. As shown, method 300 begins with start block 301. The method then proceeds to block 303, pursuant to which an inlet valve upstream of a check valve assembly is closed. Operations pursuant to block 303 may include issuing a first control signal from a controller to the inlet valve or an actuator of the inlet valve, wherein the first control signal causes the inlet valve to close, as described above in connection with FIGS. 1 and 2. The method may then proceed to optional block 305, pursuant to which an outlet valve downstream of the check valve assembly may be closed, e.g., in the manner described above. For example, operations pursuant to block 305 may include issuing a second control signal from a controller to the outlet valve or an actuator of the outlet valve, wherein the second control signal causes the outlet valve to close as described above in connection with FIGS. 1 and 2.

Following the operations of block 305 or if such operations are omitted, the method may proceed to optional block 307, pursuant to which the pressure downstream of a check valve in the check valve assembly may be monitored by the controller. Operations pursuant to block 307 may include determining the pressure detected by a pressure sensor downstream of the check valve based at least in part on sensor signals generated by the pressure sensor over a first test period (if only the inlet valve is closed) or a second test period (if both the inlet valve and outlet valve are closed), as described above.

Following the operations of block 307 the method may proceed to optional block 309 pursuant to which a determination may be made as to whether the detected pressure remained stable over the first test period (if block 305 was omitted) or the second test period (if block 305 was included). Operations pursuant to block 309 may include determining, with a controller, whether the pressure detected by the pressure sensor during the first/second test period varied by less than a threshold pressure variance. If not (i.e., the pressure varied by more than the threshold pressure variance), the method proceeds to optional block 311, pursuant to which an alert notification is issued as described above. If block 305 was omitted, the alert notification may be configured to indicate that a leak is detected downstream of the check valve assembly. If block 305 is included, the alert notification may be configured to indicate that there is a leak through the outlet valve.

If the pressure remained stable over the first and/or second test periods, the outcome of block 309 is yes and the method may proceed to block 313, pursuant to which a drawn valve fluidly coupled to the check valve assembly upstream of a check valve is opened, while the inlet valve and optionally the outlet valve remain closed. Alternatively, the method may proceed from block 303 to block 313 in instances when the operations of blocks 305-309 are omitted. Operations pursuant to block 313 may include issuing a third control signal from a controller to the drain valve or an actuator of the drain valve, wherein the third control signal is configured to cause the drain valve to open as described above in connection with FIGS. 1 and 2. The method may then proceed to block 315, pursuant to which the pressure downstream of the check valve in the check valve assembly may be monitored by the controller. Operations pursuant to block 315 may include determining the pressure detected by a pressure sensor downstream of the check valve based at least in part on sensor signals generated by the pressure sensor over a third test period, as described above.

The method may then proceed to block 317 pursuant to which a determination may be made as to whether the detected pressure remained stable over the third test period. Operations pursuant to block 317 may include determining, with a controller, whether the pressure detected by the pressure sensor during the third test period varied by less than a threshold pressure variance. If not (i.e., the pressure varied by more than the threshold pressure variance), the method proceeds to block 319, pursuant to which an alert notification is issued as described above, wherein the alert notification is configured to indicate that there is a leak through the check valve in the check valve assembly.

If the pressure remained stable during the third test period, however, the method may proceed to optional block 321, pursuant to which a pass notification may be issued. Operations pursuant to optional block 321 may include issuing a pass notification message with a controller, wherein the pass notification message is configured to cause a user interface on the controller or an external electronic device to indicate that the check valve within the check valve assembly is functioning properly. Following block 321 or if the block 321 is omitted, the method may proceed to block 323 and end.

Figure 4:
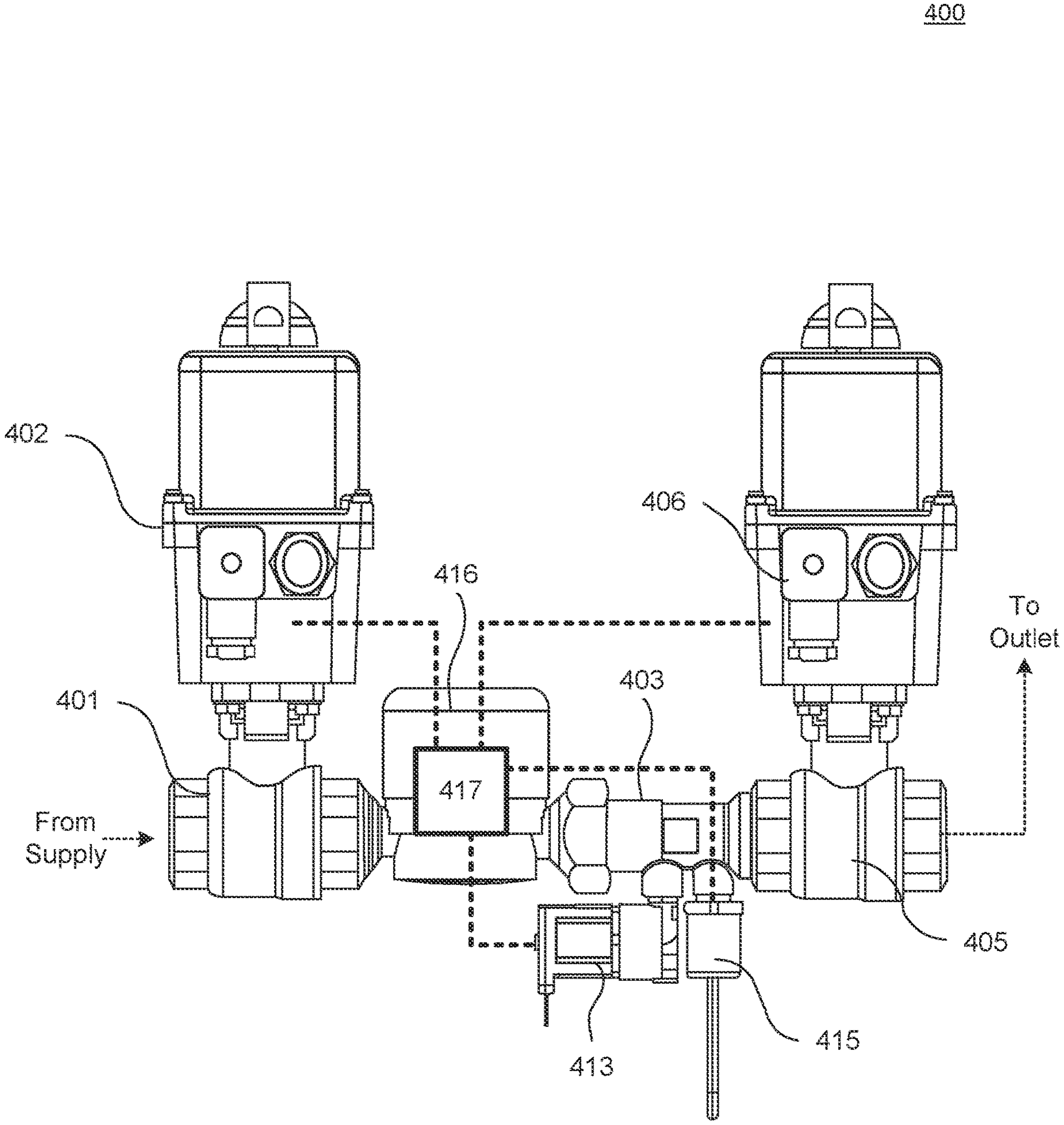
FIG. 4 is an image one example of a liquid supply system consistent with the present disclosure.
Figure 5:
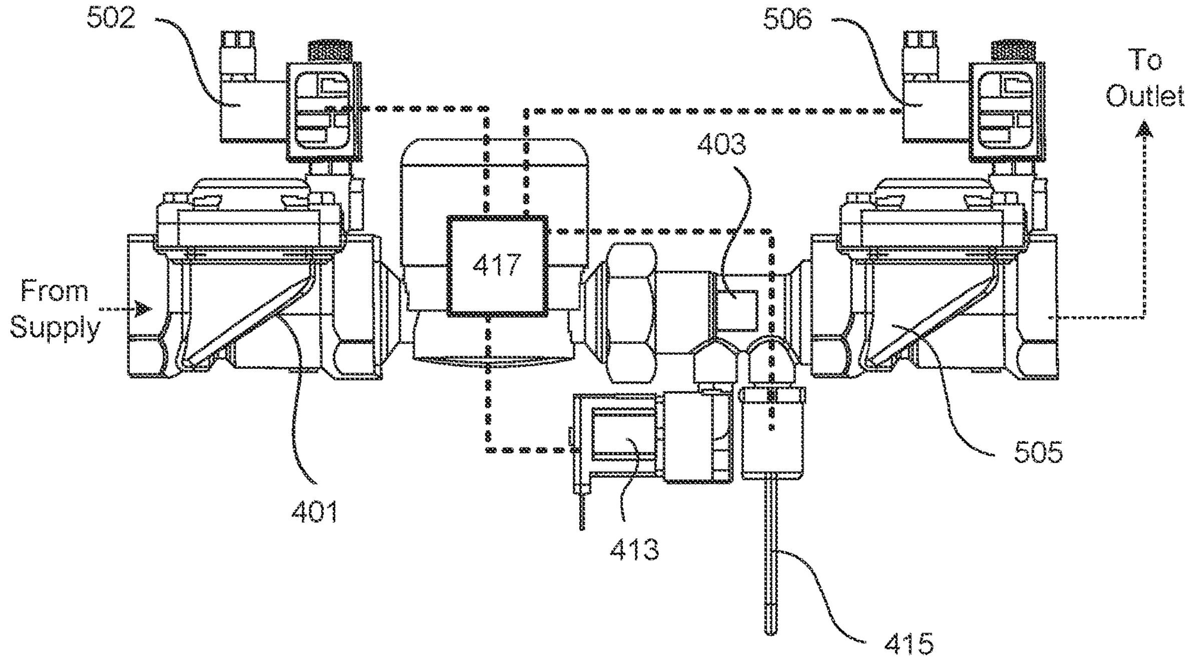
FIG. 5 is an image of another example of a liquid supply system consistent with the present disclosure.

FIGS. 4 and 5 depict additional examples of liquid supply systems consistent with the present disclosure. In FIG. 4, system 400 includes an inlet valve 401, a check valve 403, an outlet valve 405, and a drain valve 413. An outlet of the inlet valve 401 is fluidly coupled to a water meter 416, which in turn is fluidly coupled to check valve 403. Check valve 403 is fluidly coupled to drain valve 413 and outlet valve 405. Outlet valve 405 is fluidly coupled to one or more outlets in a destination. In this embodiment, inlet valve 401 and outlet valve 405 are each electronically actuatable ball valves that are movable between a closed and an open position by a first pilot 402 and a second pilot 406, respectively. In addition, water meter 416 includes an embedded controller 417. System 500 in FIG. 5 is configured in the same manner as system 400 in FIG. 4, except that it includes a different type of actuatable inlet and outlet valves. Specifically, in the embodiment of FIG. 5 inlet valve 401 and outlet valve 405 are each electronically actuatable proportional solenoid valves that are movable between a closed and an open position by a first pilot solenoid 502 and a second pilot solenoid 506, respectively. As the nature and function of the inlet valve 401, check valve 403, outlet valve 405, drain valve 413, and controller 417 in systems 400 and 500 are the same as the inlet valve 101, check valve 103, outlet valve 105, drain valve 113, and controller 117 described above for system 100, the operation of such components is not described again in the interest of brevity.

"Circuitry", as used in any embodiment herein, may comprise, for example, singly or in any combination, hardwired circuitry, programmable circuitry such as computer processors comprising one or more individual instruction processing cores, data machine circuitry, software and/or firmware that stores instructions executed by programmable circuitry.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment.

Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A check valve testing system configured to be coupled to a fluid supply system, the fluid supply system comprising a check valve assembly, an inlet valve including an inlet fluidly coupled to a fluid source and an outlet coupled to a first pressure zone, the first pressure zone being fluidly coupled to an inlet of a check valve in the check valve assembly, an inlet of an outlet valve fluidly coupled to a second pressure zone downstream of an outlet of the check valve, and a drain valve fluidly coupled to the first pressure zone, wherein the check valve testing system comprises:

a pressure sensor configured to detect a fluid pressure in the second pressure zone; and a controller configured to communicatively couple to the pressure sensor;

wherein the controller is further configured, when the inlet valve is closed and the drain valve is open, to determine whether there is a leak in the check valve based at least in part on a first sensor signal issued by said pressure sensor, the first sensor signal indicative of a detected fluid pressure in said second pressure zone; and wherein the controller is further configured, when the inlet and drain valves are closed and the outlet valve is open, to determine whether there is a leak downstream of the outlet valve based at least in part on a second sensor signal issued by said pressure sensor, the second sensor signal indicative of a detected fluid pressure in said second pressure zone.

2. The check valve testing system of claim 1, wherein the controller is further configured to determine whether there is a leak in the check valve at least in part by:

determining whether the detected fluid pressure within the second pressure zone is stable over a first test period;

when the detected fluid pressure within the second pressure zone is unstable during the first test period, determining that a leak is present in the check valve; and when the detected fluid pressure within the second pressure zone is stable during the first test period, determining that a leak is not present in the check valve.

3. The check valve testing system of claim 2, wherein determining whether the detected fluid pressure within the second pressure zone is stable over the first test period comprises:

determining whether the detected fluid pressure during the first test period varied by greater than a first pressure variance threshold; and when the detected fluid pressure during the first test period varied by greater than the first pressure variance threshold, determining that the fluid pressure in the second pressure zone is unstable.

4. The check valve testing system of claim 1, wherein the controller is configured to issue a first control signal, the first control signal configured to cause the inlet valve to close prior to determining whether there is a leak in the check valve.

5. The check valve testing system of claim 4, wherein the controller is configured to issue a second control signal, the second control signal configured to cause the drain valve to open prior to determining whether there is a leak in the check valve.

6. The check valve testing system of claim 5, wherein the controller is configured to issue a third control signal, the third control signal configured to cause the outlet valve to close prior to determining whether there is a leak in the check valve.

7. The check valve testing system of claim 1, wherein the controller is further configured to cause an alert signal to be issued when it determines that there is a leak in the check valve.

8. The check valve testing system of claim 1, wherein the controller is further configured to determine whether there is a leak downstream of the outlet valve at least in part by:

determining whether the detected fluid pressure within the second pressure zone is stable over a second test period when the inlet and drain valves are closed and the outlet valve is open;

when the detected fluid pressure within the second pressure zone is unstable during the second test period, determining that a leak is present downstream of the outlet valve; and when the detected fluid pressure within the second pressure zone is stable during the second test period, determining that a leak is not present downstream of the outlet valve.

9. The check valve testing system of claim 8, wherein determining whether the detected fluid pressure within the second pressure zone is stable over the second test period comprises:

determining whether the detected fluid pressure during the second test period varied by greater than a second pressure variance threshold; and when the detected fluid pressure during the second test period varied by greater than the second pressure variance threshold, determining that the fluid pressure in the second pressure zone is unstable.

10. A check valve testing system configured to be coupled to a fluid supply system, the fluid supply system comprising a check valve assembly, an inlet valve including an inlet fluidly coupled to a fluid source and an outlet coupled to a first pressure zone, the first pressure zone being fluidly coupled to an inlet of a check valve in the check valve assembly, an inlet of an outlet valve fluidly coupled to a second pressure zone downstream of an outlet of the check valve, and a drain valve fluidly coupled to the first pressure zone, wherein the check valve testing system comprises:

a pressure sensor configured to detect a fluid pressure in the second pressure zone; and a controller configured to communicatively couple to the pressure sensor;

wherein the controller is further configured, when the inlet valve is closed and the drain valve is open, to determine whether there is a leak in the check valve based at least in part on a first sensor signal issued by said pressure sensor, the first sensor signal indicative of a detected fluid pressure in said second pressure zone; and wherein the controller is further configured, when the inlet, drain, and outlet valves are closed, to determine whether there is a leak through the outlet valve based at least in part on a third sensor signal issued by said pressure sensor, the third sensor signal indicative of a detected fluid pressure in said second pressure zone.

11. The check valve testing system of claim 10, wherein the controller is further configured to determine whether there is a leak through the outlet valve at least in part by:

determining whether the detected fluid pressure within the second pressure zone is stable over a third test period when the inlet, drain, and outlet valves are closed;

when the detected fluid pressure within the second pressure zone is unstable during the third test period, determining that a leak is present through the outlet valve; and when the detected fluid pressure within the second pressure zone is stable during the third test period, determining that a leak is not present though the outlet valve.

12. The check valve testing system of claim 11, wherein determining whether the detected fluid pressure within the second pressure zone is stable over the third test period comprises:

determining whether the detected fluid pressure during the third test period varied by greater than a third pressure variance threshold; and when the detected fluid pressure during the third test period varied by greater than the third pressure variance threshold, determining that the fluid pressure in the second pressure zone is unstable.

13. A water supply system, comprising:

a check valve assembly comprising a check valve, a first pressure zone upstream of an inlet of the check valve, and a second pressure zone downstream of an outlet of the check valve;

an inlet valve, wherein an inlet of the inlet valve is fluidly coupled to a water source and an outlet of the inlet valve is fluidly coupled to the first pressure zone of the check valve assembly;

an outlet valve, wherein an inlet of the outlet valve is fluidly coupled to the second pressure zone;

a drain valve fluidly coupled to the first pressure zone;

a pressure sensor configured to detect a fluid pressure within the second pressure zone; and a controller;

wherein:

the controller is communicatively coupled to the pressure sensor, and is configured, when the inlet valve is closed and the drain valve is open, to determine whether there is a leak in the check valve based at least in part on a first sensor signal issued by said pressure sensor, the first sensor signal indicative of a detected fluid pressure in said second pressure zone; and the controller is further configured, when the inlet and drain valves are closed and the outlet valve is open, to determine whether there is a leak downstream of the outlet valve based at least in part on a second sensor signal issued by said pressure sensor, the second sensor signal indicative of a detected fluid pressure in said second pressure zone.

14. The water supply system of claim 13, wherein the controller is further configured to determine whether there is a leak in the check valve at least in part by:

determining whether the detected fluid pressure within the second pressure zone is stable over a first test period;

when the detected fluid pressure within the second pressure zone is unstable during the first test period, determining that a leak is present in the check valve; and when the detected fluid pressure within the second pressure zone is stable during the first test period, determining that a leak is not present in the check valve.

15. The water supply system of claim 14, wherein determining whether the detected fluid pressure within the second pressure zone is stable over the first test period comprises:

determining whether the detected fluid pressure during the first test period varied by greater than a first pressure variance threshold; and when the detected fluid pressure during the first test period varied by greater than the first pressure variance threshold, determining that the fluid pressure in the second pressure zone is unstable.

16. The water supply system of claim 13, wherein the controller is configured to issue a first control signal, the first control signal configured to cause the inlet valve to close prior to determining whether there is a leak in the check valve.

17. The water supply system of claim 16, wherein the controller is configured to issue a second control signal, the second control signal configured to cause the drain valve to open prior to determining whether there is a leak in the check valve.

18. The water supply system of claim 17, wherein the controller is configured to issue a third control signal, the third control signal configured to cause the outlet valve to close prior to determining whether there is a leak in the check valve.

19. The water supply system of claim 13, wherein the controller is further configured to cause an alert signal to be issued when it determines that there is a leak in the check valve.

20. The water supply system of claim 13, wherein the controller is further configured to determine whether there is a leak downstream of the outlet valve at least in part by:

determining whether the detected fluid pressure within the second pressure zone is stable over a second test period when the inlet and drain valves are closed and the outlet valve is open;

when the detected fluid pressure within the second pressure zone is unstable during the second test period, determining that a leak is present downstream of the outlet valve; and when the detected fluid pressure within the second pressure zone is stable during the second test period, determining that a leak is not present downstream of the outlet valve.

21. The water supply system of claim 20, wherein determining whether the detected fluid pressure within the second pressure zone is stable over the second test period comprises:

determining whether the detected fluid pressure during the second test period varied by greater than a second pressure variance threshold; and when the detected fluid pressure during the second test period varied by greater than the second pressure variance threshold, determining that the fluid pressure in the second pressure zone is unstable.

22. A water supply system of, comprising:

a check valve assembly comprising a check valve, a first pressure zone upstream of an inlet of the check valve, and a second pressure zone downstream of an outlet of the check valve;

an inlet valve, wherein an inlet of the inlet valve is fluidly coupled to a water source and an outlet of the inlet valve is fluidly coupled to the first pressure zone of the check valve assembly;

an outlet valve, wherein an inlet of the outlet valve is fluidly coupled to the second pressure zone;

a drain valve fluidly coupled to the first pressure zone;

a pressure sensor configured to detect a fluid pressure within the second pressure zone; and a controller;

wherein:

the controller is communicatively coupled to the pressure sensor, and is configured, when the inlet valve is closed and the drain valve is open, to determine whether there is a leak in the check valve based at least in part on a first sensor signal issued by said pressure sensor, the first sensor signal indicative of a detected fluid pressure in said second pressure zone; and the controller is further configured, when the inlet, drain, and outlet valves are closed, to determine whether there is a leak through the outlet valve based at least in part on a third sensor signal issued by said pressure sensor, the third sensor signal indicative of a detected fluid pressure in said second pressure zone.

23. The water supply system of claim 22, wherein the controller is further configured to determine whether there is a leak through the outlet valve at least in part by:

determining whether the detected fluid pressure within the second pressure zone is stable over a third test period when the inlet, drain, and outlet valves are closed;

when the detected fluid pressure within the second pressure zone is unstable during the third test period, determining that a leak is present through the outlet valve; and when the detected fluid pressure within the second pressure zone is stable during the third test period, determining that a leak is not present though the outlet valve.

24. The water supply system of claim 23, wherein determining whether the detected fluid pressure within the second pressure zone is stable over the third test period comprises:

determining whether the detected fluid pressure during the third test period varied by greater than a third pressure variance threshold; and when the detected fluid pressure during the third test period varied by greater than the third pressure variance threshold, determining that the fluid pressure in the second pressure zone is unstable.

25. A method of leak testing in a fluid supply system, said fluid supply system comprising a check valve assembly, an inlet valve including an inlet fluidly coupled to a fluid source and an outlet coupled to a first pressure zone, the first pressure zone being fluidly coupled to an inlet of a check valve in the check valve assembly, an inlet of an outlet valve fluidly coupled to a second pressure zone downstream of an outlet of the check valve, and a drain valve fluidly coupled to the first pressure zone, the method comprising:

when the inlet valve is closed and the drain valve is open, detecting a fluid pressure within the second pressure zone with a pressure sensor and producing a first sensor signal indicative of the detected fluid pressure; and with a controller communicatively coupled to the pressure sensor, determining whether there is a leak in the check valve based at least in part on the first sensor signal;

detecting, with the pressure sensor, the fluid pressure within the second pressure zone when the inlet and drain valves are closed and the outlet valve is open, and issuing a second pressure signal indicative of the detected pressure; and with the controller, determining whether there is a leak downstream of the outlet valve based at least in part on a second sensor signal.

26. The method of claim 25, wherein determining whether there is a leak in the check valve comprises, with the controller:

determining whether the detected fluid pressure within the second pressure zone is stable over a first test period;

when the detected fluid pressure within the second pressure zone is unstable during the first test period, determining that a leak is present in the check valve; and when the detected fluid pressure within the second pressure zone is stable during the first test period, determining that a leak is not present in the check valve.

27. The method of claim 26, wherein determining whether the detected fluid pressure within the second pressure zone is stable over the first test period comprises, with the controller:

determining whether the detected fluid pressure during the first test period varied by greater than a first pressure variance threshold; and when the detected fluid pressure during the first test period varied by greater than the first pressure variance threshold, determining that the fluid pressure in the second pressure zone is unstable.

28. The method of claim 25, further comprising issuing a first control signal with the controller, the first control signal configured to cause the inlet valve to close prior to determining whether there is a leak in the check valve.

29. The method of claim 28, further comprising issuing a second control signal with the controller, the second control signal configured to cause the drain valve to open prior to determining whether there is a leak in the check valve.

30. The method of claim 29, further comprising issuing a third control signal with the controller, the third control signal configured to cause the outlet valve to close prior to determining whether there is a leak in the check valve.

31. The method of claim 25, further comprising issuing an alert signal with the controller when it is determined that there is a leak in the check valve.

32. The method of claim 25, wherein determining whether there is a leak downstream of the outlet valve further comprises, with the controller:

determining whether the detected fluid pressure within the second pressure zone is stable over a second test period;

when the detected fluid pressure within the second pressure zone is unstable during the second test period, determining that a leak is present downstream of the outlet valve; and when the detected fluid pressure within the second pressure zone is stable during the second test period, determining that a leak is not present downstream of the outlet valve.

33. The method of claim 32, wherein determining whether the detected fluid pressure within the second pressure zone is stable over the second test period comprises, with the controller:

determining whether the detected fluid pressure during the second test period varied by greater than a second pressure variance threshold; and when the detected fluid pressure during the second test period varied by greater than the second pressure variance threshold, determining that the fluid pressure in the second pressure zone is unstable.

34. A method of leak testing in a fluid supply system, said fluid supply system comprising a check valve assembly, an inlet valve including an inlet fluidly coupled to a fluid source and an outlet coupled to a first pressure zone, the first pressure zone being fluidly coupled to an inlet of a check valve in the check valve assembly, an inlet of an outlet valve fluidly coupled to a second pressure zone downstream of an outlet of the check valve, and a drain valve fluidly coupled to the first pressure zone, the method comprising:

when the inlet valve is closed and the drain valve is open, detecting a fluid pressure within the second pressure zone with a pressure sensor and producing a first sensor signal indicative of the detected fluid pressure; and with a controller communicatively coupled to the pressure sensor, determining whether there is a leak in the check valve based at least in part on the first sensor signal detecting, with the pressure sensor, the fluid pressure within the second pressure zone when the inlet, outlet, and drain valves are closed, and issuing a third sensor signal indicative of the detected pressure; and with the controller, determining whether there is a leak through the outlet valve when the inlet, outlet, and drain valve are closed based at least in part on a third sensor signal issued by said pressure sensor.

35. The method of claim 34, wherein determining whether there is a leak through the outlet valve comprises, with the controller:

determining whether the detected fluid pressure within the second pressure zone is stable over a third test period when the inlet, drain, and outlet valves are closed;

when the detected fluid pressure within the second pressure zone is unstable during the third test period, determining that a leak is present through the outlet valve; and when the detected fluid pressure within the second pressure zone is stable during the third test period, determining that a leak is not present though the outlet valve.

36. The method of claim 35, wherein determining whether the detected fluid pressure within the second pressure zone is stable over the third test period comprises, with the controller:

determining whether the detected fluid pressure during the third test period varied by greater than a third pressure variance threshold; and when the detected fluid pressure during the third test period varied by greater than the third pressure variance threshold, determining that the fluid pressure in the second pressure zone is unstable.

* * * * *